UNITED STATES PATENT OFFICE.

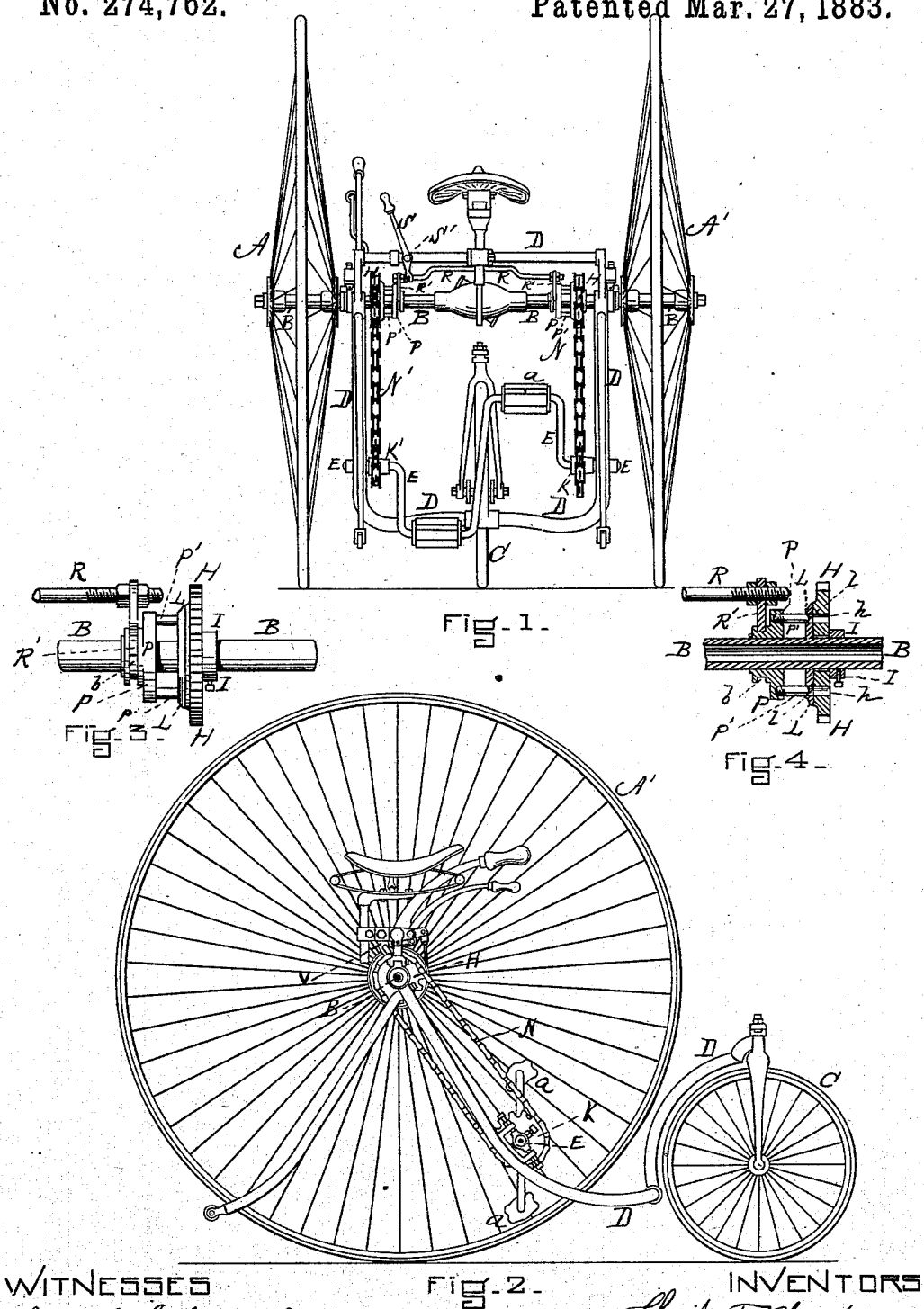

CHARLES F. HANDY AND WENDELL P. ANTHONY, OF PROVIDENCE, RHODE ISLAND, ASSIGNORS TO THE POPE MANUFACTURING COMPANY, OF BOSTON, MASSACHUSETTS.

TRICYCLE.

SPECIFICATION forming part of Letters Patent No. 274,762, dated March 27, 1883.

Application filed January 22, 1883. (No model.)

*To all whom it may concern:*

Be it known that we, CHARLES F. HANDY and WENDELL P. ANTHONY, both of Providence, in the county of Providence and State of Rhode Island, have invented a new and useful Improvement in Tricycles, of which the following is a specification.

This invention relates to the driving mechanism of a tricycle; and it consists of a "two-speed gear"—that is to say, gear applied to the driving or pedal shaft for the communication of power to the axle and driving wheel or wheels—by means of which either of two speeds may be produced in said driving-shaft, both of which different speeds producing the same speed in the driving wheel or wheels, such two-speed gear being constructed and arranged substantially as below specified.

The object of a two-speed gear as applied to a tricycle is principally to enable the rider to propel his vehicle up a steep ascent or through deep sand, snow, or other obstructive matter without undue exertion. For example, when the tricycle is being propelled over a smooth level road the most efficient gear is that which is geared "level"—*i. e.*, so that the speed of the driving-shaft and axle are equal, or geared for speed—*i. e.*, so that the speed of the driving-shaft is less than that of the axle; but when the tricycle is to be driven up a steep ascent or over a sandy road the most efficient gear is that which is geared for "power"—*i. e.*, so that the speed of the driving-shaft is greater than that of the axle.

The tricycle to which the invention may be applied can be a "double" or "single" driver, and steered in any manner.

In the accompanying drawings, in which similar letters of reference indicate like parts, Figure 1 is a rear elevation of a double-driving front-steering tricycle with our invention applied thereto. (The steering mechanism is removed, it being no part of the invention.) Fig. 2 is a side elevation of the same. Fig. 3 is an enlarged elevation of a portion of the axle of the driving-wheels with the clutch, &c., below specified. Fig. 4 is a longitudinal vertical section of the same.

A A' are the driving-wheels, rigidly secured to the axle B.

C is the steering-wheel; D, the frame; and E, the driving-shaft or pedal-shaft, (sometimes termed the "crank-shaft,") provided with the pedals *a a*, all constructed substantially as usual.

H is a chain-wheel, having, say, twelve sprockets on its periphery, provided with the perforations or openings *h*, placed loosely on the axle B, and prevented from lateral movement by the collar I and the face-plate L, both fast on the axle, and the latter provided with perforations *l*, corresponding with the openings *h* in the wheel H.

K is a chain-wheel, having, say, fourteen teeth, fast on the driving-shaft E. An endless chain, N, transmits motion from the wheel K to the wheel H. An exactly similar wheel, H, having the same number of teeth or sprockets (twelve) is loosely placed on the axle near the opposite driving-wheel, as shown, and is held from lateral motion by a similar collar, I, and face plate L. This wheel (the left in Fig. 1,) is connected by the endless chain N' with the chain-wheel K', fixed on the driving-shaft E, said chain-wheel K' being provided with, say, nine teeth.

P P are clutches, the pins P' in which fit into the perforations *l* in the face-plates L, and the openings *h* in the chain-wheels H. These clutches are connected by the rod R, which has straddling-legs R', which lie in the annular grooves *b* in the clutches P. A shipping-lever, S, fulcrumed at S' in the frame D, engages the rod so as to move it longitudinally. When the shipping-lever S is in the position shown in the drawings the rod R is centrally situated, so that the pins P' in both clutches P lie in the perforations *l* in the face-plate L, but do not enter the openings *h* in the chain-wheels H. In this position no power can be applied to the axle B or driving-wheels, as although the clutches rotate with the axle, being carried by the face-plates L, the chain-wheels H, which connect with the driving-shaft E, slip on the axle. This is the position assumed in running down a smooth hill, the rider sitting with his feet resting on the stationary pedals and controlling the speed by means of the brake. When level ground is to be driven over the connecting-rod R is moved toward the driving-wheel A', thus causing the pins P' of the clutch P on that side to engage the wheel H next to it. By this means the wheel H, having twelve teeth, will be driven by the wheel K, having fourteen teeth, and motion imparted to the axle B with the tricycle geared for speed. When a steep hill is to be mounted the connecting-rod R is moved toward the driving-wheel A, thus causing the clutch P on that side to engage the wheel H next to it, and the tricycle is driven by the wheel K', having nine teeth, which communicates power through the wheel H on that side, having twelve teeth, and the tricycle is geared for power. The connecting-rod R is held up in any convenient manner, preferably by a downwardly-extending rod or guide bolted to the seat-support and bifurcated at its lower end, as shown at V, Fig. 2.

The number of teeth in the wheels K K' may be varied at will, as may those in the wheels H H, provided that different speeds are produced. The clutches P may be splined to the axle B, if desired, (being of course free for lateral movement,) in which case the face-plates L could be omitted; but the arrangement illustrated is preferred.

Having thus fully described our invention, what we claim and desire to secure by Letters Patent, is—

1. In a tricycle, the combination of the driving-shaft E, provided with the chain-wheels K K', differential in speed, chains N N', and axle B, provided with the chain-wheels H H and clutches P P, and connecting-rod R, substantially as and for the purpose described.

2. In a tricycle, the combination of the driving-shaft E, provided with the chain-wheels K K', differential in speed, chains N N', axle B, wheels H, face-plates L, clutches P, connecting-rod R, shipping-lever S, and guide V, all arranged and constructed substantially as and for the purpose described.

CHARLES F. HANDY.
WENDELL P. ANTHONY.

Witnesses:
HENRY W. WILLIAMS,
JOSEPH ISHBAUGH.